Oct. 13, 1959  O. H. HALLSTRÖM  2,908,286
CONNECTOR VALVE FOR CENTRAL SUCTION PLANTS
Filed June 1, 1956  4 Sheets-Sheet 1

INVENTOR:
Olof Hendrik Hallström
BY: Michael S. Striker
agt.

Oct. 13, 1959     O. H. HALLSTRÖM     2,908,286
CONNECTOR VALVE FOR CENTRAL SUCTION PLANTS
Filed June 1, 1956     4 Sheets-Sheet 2

INVENTOR:
Olof Hendrik Hallström

BY: Michael S. Striker
   ayt.

Oct. 13, 1959  O. H. HALLSTRÖM  2,908,286
CONNECTOR VALVE FOR CENTRAL SUCTION PLANTS
Filed June 1, 1956  4 Sheets-Sheet 3

INVENTOR:
Olof Hendrik Hallström

BY: Michael S. Striker
       agt.

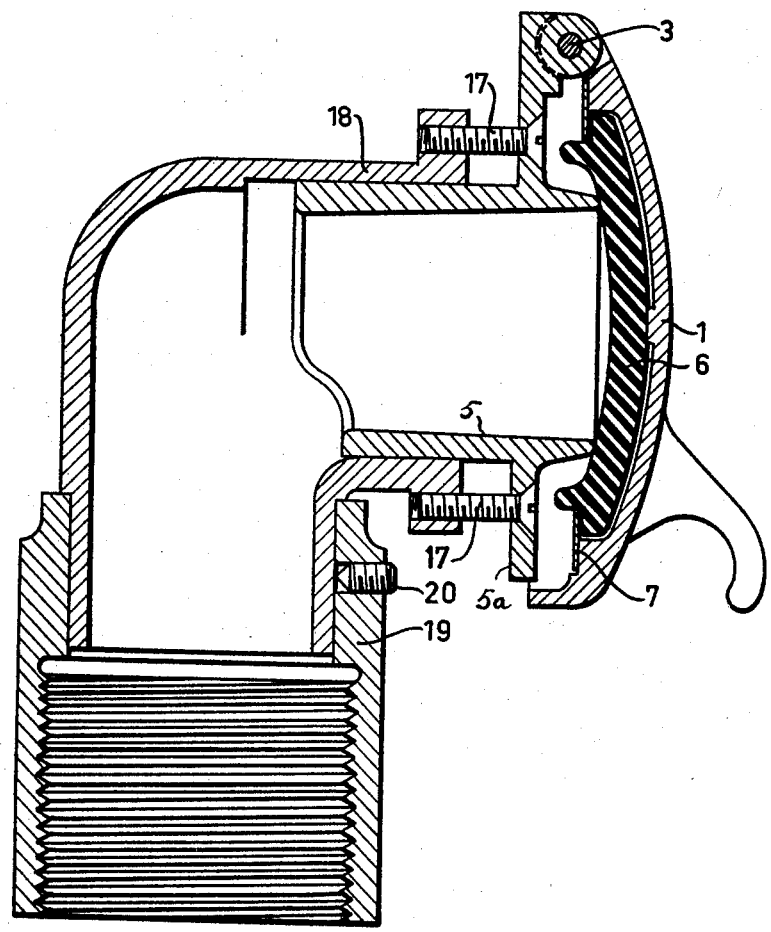

United States Patent Office 2,908,286
Patented Oct. 13, 1959

2,908,286

CONNECTOR VALVE FOR CENTRAL SUCTION PLANTS

Olof Henrik Hallström, Stockholm, Sweden

Application June 1, 1956, Serial No. 588,735

5 Claims. (Cl. 137—522)

The present invention has reference to a connector or a valve for connecting a local suction hose, especially a vacuum cleaning hose, to a central plant. The connector is fitted with a seat for connecting the suction hose and with a lid, or such like, suspended in a suitable manner for sealing against this seat.

The object of the invention is to improve such connectors, or connecting valves, known in themselves, with a view to facilitating effective sealing, and enabling at the same time easily opening and rapidly reclosing of the valve after use. The main characterizing feature of the invention is that the lid comprises an insert freely movable in relation to the lid within certain limits for sealingly engaging the seat under the influence of suction action, and means for retaining the insert to the lid, said means engaging the outer part of the insert outside said seat. The valve body proper thus does not consist of the lid itself but of the insert loosely fitted in the lid, the sealing action of which is not caused, as in known embodiments, by a stiff lid being pressed against the seat by means of a fixed packing, but by adhesive suction of the insert to the seat. Since the lid has no longer any sealing function its design and mounting are simplified. The insert can be produced on a large scale and need not be processed, as it adjusts itself flexibly to the shape of the seat.

Other details and advantages characteristic of the invention will be seen from the following description of an embodiment shown on the attached drawings.

Figure 1:
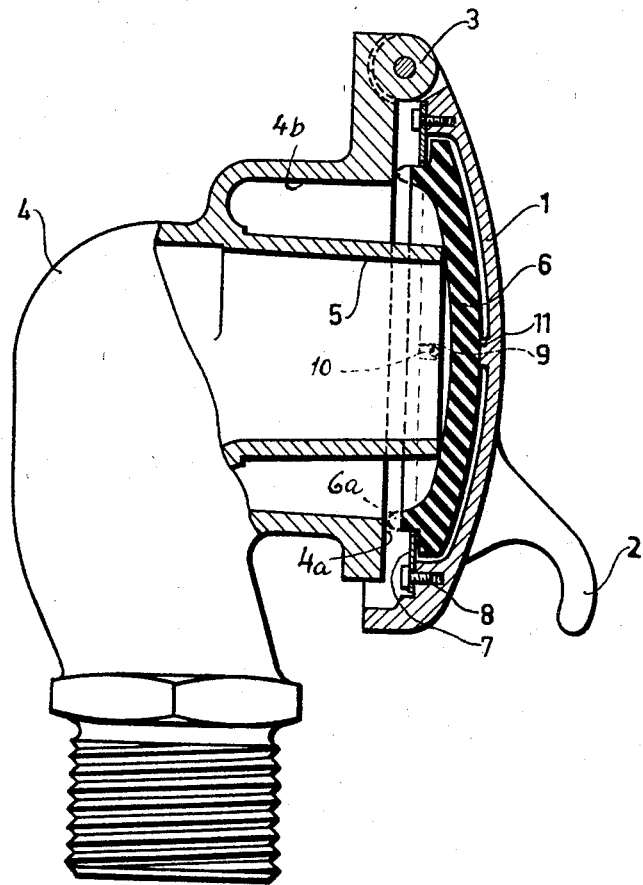
Fig. 1 is a side view of a connector or a valve according to the invention, partly in longitudinal section.
Figure 2:
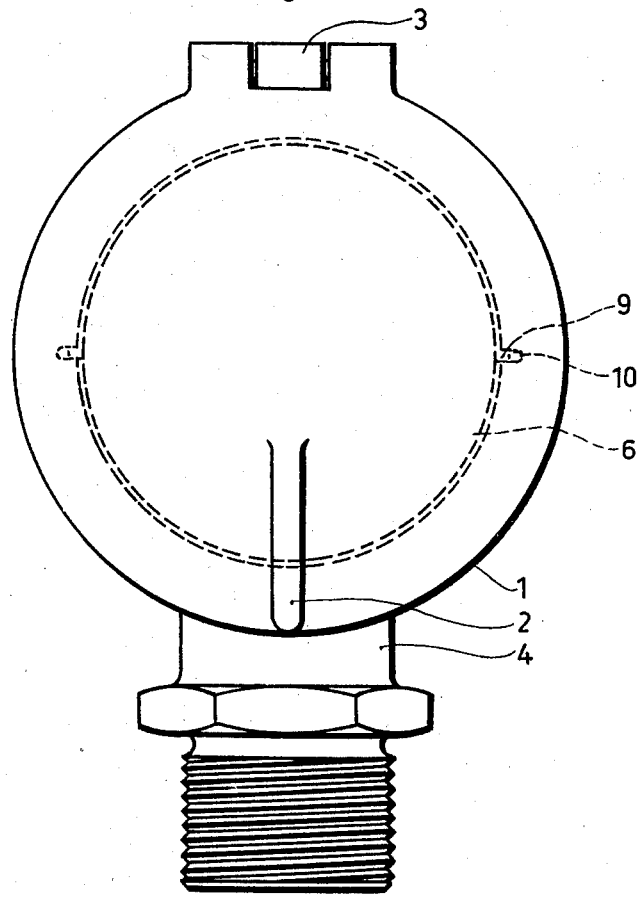
Fig. 2 shows a front view of the connector.
Figure 3:

Fig. 3 a section through the insert of the lid at right angles to the section according to Fig. 1.

Figure 4:
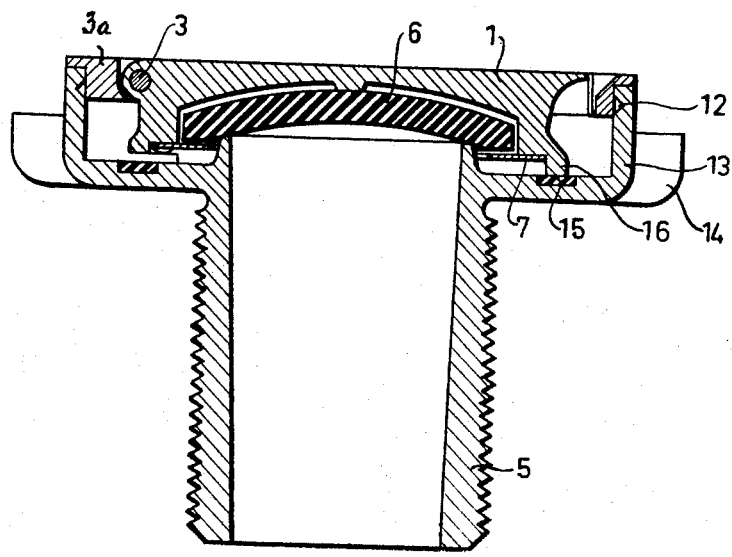

Figs. 4 and 5 illustrate two further embodiments in section.

Connector 4, which is connected to a central suction pipe has the shape of an elbow pipe, the connection end of which consists of a conically tapering pipe socket 5, which is encircled by a flanged collar on the connector. Mounted on the flange by means of a hinge 3 is a lid 1. The central suction pipe (not shown on the drawing) has several such connectors 4 at desired places so as to enable an appropriate suction hose to be connected thereto. It is of great importance that the connectors not being used for the time being for suction purposes, shall be kept tightly closed, and lid 1 is therefore, according to the invention, equipped with an insert 6, movably mounted, of a suitable, e.g. flexible and elastic material, such as rubber or plastic, although the insert can also consist of a steel or metal plate. Insert 6 is preferably vaulted in the form of a bowl with the top of the vaulting pointing outwards from pipe socket 5. Insert 6 lies essentially loose in the lid and in order that it shall accompany the lid when this is being opened, a ring 7, which overlaps inwards the peripheral rim of the insert 6, is attached to the inside of lid 1 by means of screws 8. Ring 7 thus does not jam insert 6, but merely forms a follower device. The ring can be substituted by several holder parts arranged in a circle. As has been mentioned the sealing is effected by insert 6 adhering by suction against the end of pipe socket 5. In order to prevent insert 6, in vertical mounting of the lid, resting against the lower rim of ring 7 under the influence of its weight and thus possibly fastening, it can be suspended in a pair of radially projecting pivots or pins 9, which are fitted into the insert and preferably extend along one and the same diameter. Pins 9 are mounted in bores or recesses 10 in the lid, which preferably are parallel to the suspension axis 3 of the lid. Recesses 10 are so commodious that they not only render possible an oscillating movement of insert 6 around pins 9, but also permit the insert to move axially, in relation to pipe socket 5, towards the latter under the influence of the suction in connector 4. Due to the fact that the insert can effect this oscillating or tilting movement the opening of the lid is facilitated against the effect of the suction acting against the insert, and, in addition, the insert is able to adjust itself according to the corresponding surface of the valve seat (pipe socket 5) in a more accommodating manner. When lid 1 swings outwards its lower part will move farther than the upper one, which lies nearer the oscillating axis 3. The lower part of ring 7 will therefore first engage the corresponding part of insert 6, under simultaneous oscillating of the latter round pins 9, so that the insert, at least at the opposite rim in relation in hinge 3, is released from its contact with pipe socket 5, thus interrupting the suction action on the insert, and lid 1 can easily be opened in its entirety. The device is very effective and facilitates to a great extent the rapid, simple opening of the valve, even when the suction action is great. Pins 9 can, however, be dispensed with, if desired.

Lid 1 has a shoulder 2 on its outside made as a grip for rapid opening of the valve. When it is desired to open the valve shoulder 2 is pressed upwards with the finger, and then the end of the hose is slipped on to pipe socket 5. The other end of the hose there terminates with a vacuum cleaner nozzle. When vacuum cleaning is to be stopped the hose is pulled off pipe socket 5, whereby lid 1 automatically falls down by the action of its own gravity, and under the influence of the suction action insert 6 will move in towards the pipe socket so as to engage the latter sealingly.

In order to transmit the weight of lid 1 to insert 6, and thus retain the latter in a closing position even when suction is weak, a lip 11 is arranged on the inside and middle of the lid. This lip engages the outer surface of insert 6 and can also, if desired, act as a tilting journal.

The suction hose is intended to be fitted onto pipe socket 5, the latter causing a certain reduction of the effective suction area. If a greater area is desired the vacuum cleaning hose can be arranged to engage sealingly by its outer periphery a cylindrical seat, or a socket 4b in the connector. In this case the insert 6 must have, e.g. a bulge 6a extending round the inner periphery, so as to sealingly engage a corresponding sealing surface 4a on the end flange of the connector for suspending the lid.

The lid can be installed, as desired, in a vertical position in a wall, or in a horizontal position in a floor. An embodiment of the latter type is shown in Fig. 4. In order to relieve insert 6 of too strong a pressure, if the lid should be stepped on, it can be furnished on the inside with lips 16 which rest on an annular gasket 15 in the part 13 of pipe socket 5. The insert being movable, as indicated above, its sealing function is ensured also in this case.

According to Fig. 4 the hinge 3 is suspended in a ring 3a which is adjustably fitted in the part 13 and secured thereto by means of screws (not shown) extending through ring 3a and engaging an annular groove 12 in part 13. Part 13 may have fins 14 or the like for facilitating its attachment to the floor. In mounted position the lid is flush with the surface of the floor.

In the embodiment according to Fig. 5 the end of the vacuum cleaning hose is intended to engage the inside of the tapering pipe socket 5' having a flange 5a, by means of which the socket is adjustably attached to an intermediary element 18 by means of screws 17. In this case the connector is intended to be mounted at a vertical wall with flange 5a on one side of the wall and the corresponding flange of element 18 on the other side thereof. Element 18 consists of an elbow pipe adjustably fitted in a vertical pipe socket 19 and secured thereto in desired position by means of a set screw 20.

What I claim is:

1. In a suction outlet for a vacuum cleaner system, in combination, suction pipe means adapted to be connected at one end thereof to said vacuum cleaner system; a valve seat formed at the other end of said suction pipe means; a lid hingedly connected to said suction pipe means for turning movement about an axis between a closed position in which said lid extends over said valve seat and an open position; a valve member having a valve seat engaging portion and being loosely arranged in said lid for limited movement relative thereto, said valve member fluid tightly engaging said valve seat under the influence of the suction action of said vacuum cleaner system when said lid is in said closed position; a pair of pins fastened to said valve member and projecting therefrom in opposite directions substantially parallel to said turning axis of said lid member, and said lid being formed with a pair of slots extending in the direction of said pins and substantially normal thereto inwardly into said lid and said pins being located in said slots so that said valve member may oscillate about the axis of said pins relative to the lid and move also in a direction normal to the pin axis; and retaining means fastened to said lid for retaining said valve member loosely in said lid and for moving said valve member together with said lid between said closed and open position thereof, said retaining means engaging said valve member only at portions located outside of said valve seat engaging portions thereof.

2. In a suction outlet for a vacuum cleaner system, in combination, suction pipe means adapted to be connected at one end thereof to said vacuum cleaner system; a valve seat formed at the other end of said suction pipe means; a lid hingedly connected to said suction pipe means for turning movement about an axis between a closed position in which said lid extends over said valve seat and an open position; a disc-shaped valve member having an annular valve seat engaging portion spaced from the periphery of said valve member and being loosely arranged in said lid for limited movement relative thereto, said valve member fluid tightly engaging said valve seat under the influence of the suction action of said vacuum cleaner system when said lid is in said closed position; and retaining means fastened to said lid for retaining said valve member loosely in said lid so that said valve member may move slightly in direction of its axis and tilt slightly relative to said lid and for moving said valve member together with said lid between said closed and open position thereof, said retaining means engaging said valve member only at portions located outside of said valve seat engaging portions thereof and said retaining means having an engaging portion engaging said valve member at a portion thereof spaced farther from the turning axis of said lid than the other portions thereof, whereby during turning of said lid from said closed to said open position thereof, said engaging portion will engage said valve member to tilt said valve member relative to said lid so as to facilitate the opening of said lid against the suction force in the suction pipe means.

3. In a suction outlet for a vacuum cleaner system, in combination, suction pipe means adapted to be connected at one end thereof to said vacuum cleaner system; a valve seat formed at the other end of said suction pipe means; a lid hingedly connected to said suction pipe means for turning movement about an axis between a closed position in which said lid extends over said valve seat and an open position; a disc-shaped valve member having an annular valve seat engaging portion spaced from the periphery of said valve member and being formed from flexible and compressible material and loosely arranged in said lid for limited movement relative thereto, said valve member fluid tightly engaging said valve seat under the influence of the suction action of said vacuum cleaner system when said lid is in said closed position; and annular retaining means fastened to said lid for retaining said valve member loosely in said lid so that said valve member may move slightly in direction of its axis and tilt slightly relative to said lid and for moving said valve member together with said lid between said closed and open position thereof, said retaining means engaging said valve member only at portions located outside of said valve seat engaging portions thereof and said retaining means having an engaging portion engaging said valve member at a portion thereof spaced farther from the turning axis of said lid than the other portions thereof, whereby during turning of said lid from said closed to said open position thereof, said engaging portion will engage said valve member to tilt said valve member relative to said lid so as to facilitate the opening of said lid against the suction force in the suction pipe means.

4. In a suction outlet for a vacuum cleaner system, in combination, suction pipe means adapted to be connected at one end thereof to said vacuum cleaner system; a valve seat formed at the other end of said suction pipe means; a lid hingedly connected to said suction pipe means for turning movement about an axis between a closed position in which said lid extends over said valve seat and an open position; a disc-shaped valve member having an annular valve seat engaging portion spaced from the periphery of said valve member and being formed from flexible and compressible material and loosely arranged in said lid for limited movement relative thereto, said valve member fluid tightly engaging said valve seat under the influence of the suction action of said vacuum cleaner system when said lid is in said closed position; a pair of pins fastened to said valve member and projecting therefrom in opposite directions substantially parallel to said turning axis of said lid member, and said lid being formed with a pair of slots extending in the direction of said pins and substantially normal thereto inwardly into said lid and said pins being located in said slots so that said valve member may oscillate about the axis of said pins relative to the lid and move also in a direction normal to the pin axis; and annular retaining means fastened to said lid for retaining said valve member loosely in said lid and for moving said valve member together with said lid between said closed and open position thereof, said retaining means engaging said valve member only at portions located outside of said valve seat engaging portions thereof.

5. In a suction outlet for a vacuum cleaner system, in combination, suction pipe means adapted to be connected at one end thereof to said vacuum cleaner system; a valve seat formed at the other end of said suction pipe means; a lid hingedly connected to said suction pipe means for turning movement about an axis between a closed position in which said lid extends over said valve seat and an open position, said lid being formed with a cavity facing said other end of said suction pipe means when said lid is in said closed position; a valve member arranged with clearance in said cavity of said lid for movement relative to said lid, said valve member fluid tightly engaging said valve seat under the influence of the suction action of said vacuum cleaner system when said lid is in said closed position, and said lid being formed with a central projection projecting inwardly into said cavity thereof and engaging a central portion of said valve member when said lid is in said closed position thereof; and retaining means fastened to said lid so that said valve member may move slightly in direction of its axis and tilt slightly relative to said lid for retaining said valve member loosely in said lid and for moving said valve member together with said lid between said closed and open positions thereof and said retaining means having an engaging portion engaging said valve member at a portion thereof spaced farther from the turning axis of said lid than the other portions thereof, whereby during turning of said lid from said closed to said open position thereof, said engaging portion will engage said valve member to tilt said valve member relative to said lid so as to facilitate the opening of said lid against the suction force in the suction pipe means.

References Cited in the file of this patent

UNITED STATES PATENTS

| | | |
|---|---|---|
| 1,037,083 | Thurman | Aug. 27, 1912 |
| 1,096,278 | Sutton | May 12, 1914 |
| 1,255,175 | Kellogg | Feb. 5, 1918 |
| 1,743,293 | Toft | Jan. 14, 1930 |
| 2,311,110 | Johnson | Feb. 16, 1943 |
| 2,708,766 | Thornwaid | May 24, 1955 |
| 2,717,757 | Bowlzer | Sept. 13, 1955 |
| 2,735,644 | Bishopberger | Feb. 21, 1956 |

FOREIGN PATENTS

| | | |
|---|---|---|
| 680,031 | Germany | Aug. 19, 1939 |
| 849,340 | Germany | Sept. 15, 1952 |